(No Model.)
W. H. BARTELS.
MACHINE FOR CUTTING GRASS AND WEEDS FROM RAILROAD TRACKS.
No. 325,584. Patented Sept. 1, 1885.
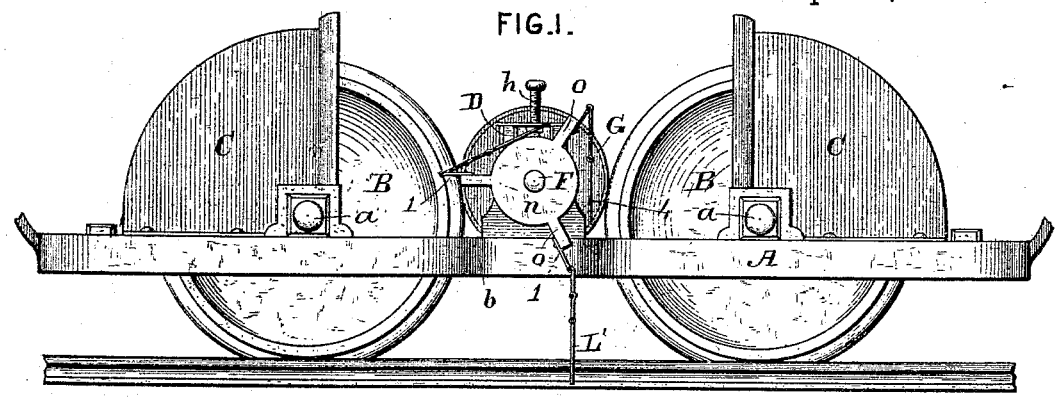
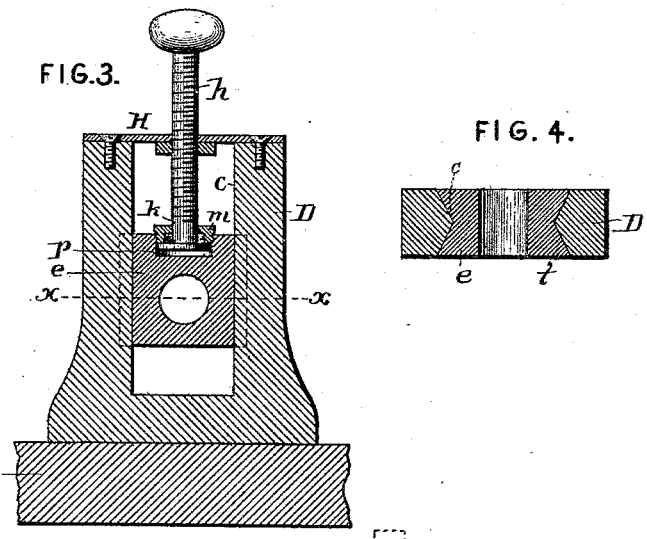
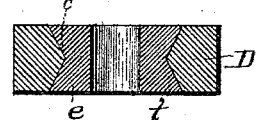
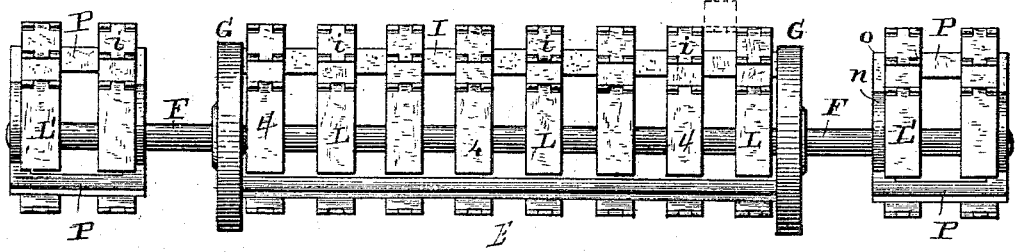
ATTEST_
Jno. A. Sibbald
J. Walter Cookney
INVENTOR_
W. H. Bartels.
per O. H. Herring
Atty.

UNITED STATES PATENT OFFICE.

WILLIAM HENRY BARTELS, OF CARTHAGE, ILLINOIS, ASSIGNOR OF TWO-THIRDS TO GEORGE EDMUNDS, OF CARTHAGE, ILLINOIS, AND GUS VOTE, OF FAIRFIELD, IOWA.

MACHINE FOR CUTTING GRASS AND WEEDS FROM RAILROAD-TRACKS.

SPECIFICATION forming part of Letters Patent No. 325,584, dated September 1, 1885.

Application filed February 9, 1885. (No model.)

*To all whom it may concern:*

Be it known that I, WILLIAM HENRY BARTELS, a citizen of the United States, residing at Carthage, in the county of Hancock and State of Illinois, have invented certain new and useful Improvements in Machines for Cutting Grass and Weeds from Railroad-Tracks; and I do hereby declare the following to be a full, clear, and exact description of the invention, such as will enable others skilled in the art to which it appertains, to make and use the same.

The object of this invention is to produce a machine which will expeditiously and effectually cut grass and weeds from between and from each side of the rails of a railroad-track, and which will be simple of construction and readily attached to any car-truck frame; and it consists in the mechanism and combinations of mechanism hereinafter described and claimed.

In the accompanying drawings, forming part of this specification, and in which similar letters designate like parts, Figure 1 is a side elevation of my machine; Fig. 2, a side elevation of the cutter-cylinder, and Figs. 3 and 4 detail sectional views of one of the adjustable boxes and accessories.

A represents the frame of an ordinary car-truck in which are journaled the axles $a$ of the flanged car-wheels B B. To each end of the frame A is secured a protecting-hood, C C, of sheet metal, or other suitable material, so as to partly cover the wheels B B. The side pieces of the frame A are bent or curved inwardly at about their centers and between the wheels B B on each side to form supporting-bases $b$ for the short vertical supports or uprights D. These supports or uprights D have formed on their contiguous or inner faces ways $c\ c$, to receive the adjustable boxes $e$, the latter having V-shaped grooves $ff$ fitting the ways $c\ c$. The boxes $e$ are supported and made to slide vertically in the uprights D by means of the screw-bolts $h$ passing through screw-threaded openings in the bars H, the latter being secured to the upper ends of the uprights D by screws or otherwise, as desired. The screw-bolts $h$ have a portion of their threads cut away at their ends, as at $k$, and are provided with heads $p$, which are fitted to countersunk-nuts $m$, screwing into or otherwise secured to the boxes $e$. By thus securing the heads $p$ of the screws $h$ in the nuts $m$, they are permitted to freely revolve therein while raising and lowering the boxes $e$ to adjust the shaft F and cylinder E.

G G are friction-wheels secured on the shaft F near its ends so as to rotate said shaft. The peripheries of these wheels are covered with leather, rubber, or other suitable material, and rest, when in position for use, between and on the flanges of the car-wheels B B so as to be rotated by said car-wheels in a direction opposite to the direction of their rotation.

I I are bars, three, more or less, in number, which extend transversely across the machine parallel to the shaft F, and have their ends firmly secured to the wheels G G. To these bars are secured my improved cutting or breaking plates L L. These plates are made of flat pieces or sheets of metal of suitable hardness, and in sections, usually four, and are joined or hinged together at $i\ i$, so that they may give or yield if brought in contact with any obstacle of a hard nature—such as a projecting tie or a rock—and pass such obstacle without injury and resume their position for operation. They are of a length, when joined together for operation and attached to the bars I, to just miss the ties. The end sections numbered 4 are of a greater length than the other sections, but in other respects the sections are similar. The sections numbered 1 have perforations made in them to receive the screws or bolts for securing them to the bars I.

Should any of the plates be injured or damaged, or become worn so as to be unfit for use, they may be easily removed and others substituted without disturbing the others of the series. These plates are placed at suitable intervals apart along the rods I I and extend clear across from wheel to wheel, sweeping the space between the rails. As shown, they are arranged to follow each other in the same track, but I propose, also, to arrange them so that the plates on one bar will break joint with those on the next bar, as shown in dotted lines in Fig. 2.

The shaft F extends beyond the frame A on each side, and is provided with two disks, $n$ $n$, of a smaller diameter than the wheels G G on each end. These disks have projections $o$ $o$, to which are secured bars or rods P, which are provided with plates L', attached in the same manner and in all respects the same as those on the bars I I.

Having thus described my invention, what I claim as new, and desire to secure by Letters Patent, is—

1. A grass and weed cutting machine comprising the following instrumentalities: a truck-frame, A, having the supporting-bases $b$, car-wheels B, uprights D, shaft F, wheels G, bars I, hinged plates L L, disks $n$, boxes $e$, screw-bolts $h$, and bars H, substantially as and for the purpose described.

2. The combination, with a car-truck frame and wheels, of the shaft F, friction-wheels G, disks $n$, and plates L L', as and for the purpose set forth.

3. A cylinder or drum for grass and weed cutting machines, comprising the shaft F, the wheels G, the bars I, and the hinged cutting-plates L, substantially as and for the purpose described.

4. The combination, in a grass and weed cutting machine, of the frame A, the wheels B, the plate carrying cylinder E, and hinged cutting-plates, substantially as and for the purpose described.

5. In a machine for cutting grass and weeds from railroad-tracks, the combination, with the truck-frame A, the supporting-bases $b$, the uprights D, and the car-wheels B, of the shaft F, adjustable boxes $e$, friction-wheels G, bars I, and suitable cutting-plates attached to said bars, as and for the purpose set forth.

6. A cutter-cylinder for machines for cutting grass and weeds from railroad-tracks, comprising a shaft, friction-wheels, transverse bars secured to said wheels, sectional cutting-plates hinged together and secured to said bars, disks on each end of said shaft having projections, rods secured to the projections, and cutting-plates secured to said rods, substantially as set forth.

7. The combination, with a railroad-car truck and wheels, of a cylinder carrying hinged metallic cutters, as and for the purpose set forth.

8. The combination, with a car truck and wheels, of a cutting-cylinder and means for operating said cylinder by direct connection with the car-wheels, substantially as and for the purpose described.

In testimony whereof I affix my signature in presence of two witnesses.

WILLIAM HENRY BARTELS.

Witnesses:
G. VOTE,
J. D. EDMUNDS.